July 5, 1966 W. D. PARKER 3,259,893
HOLIDAY DETECTOR
Filed July 24, 1962
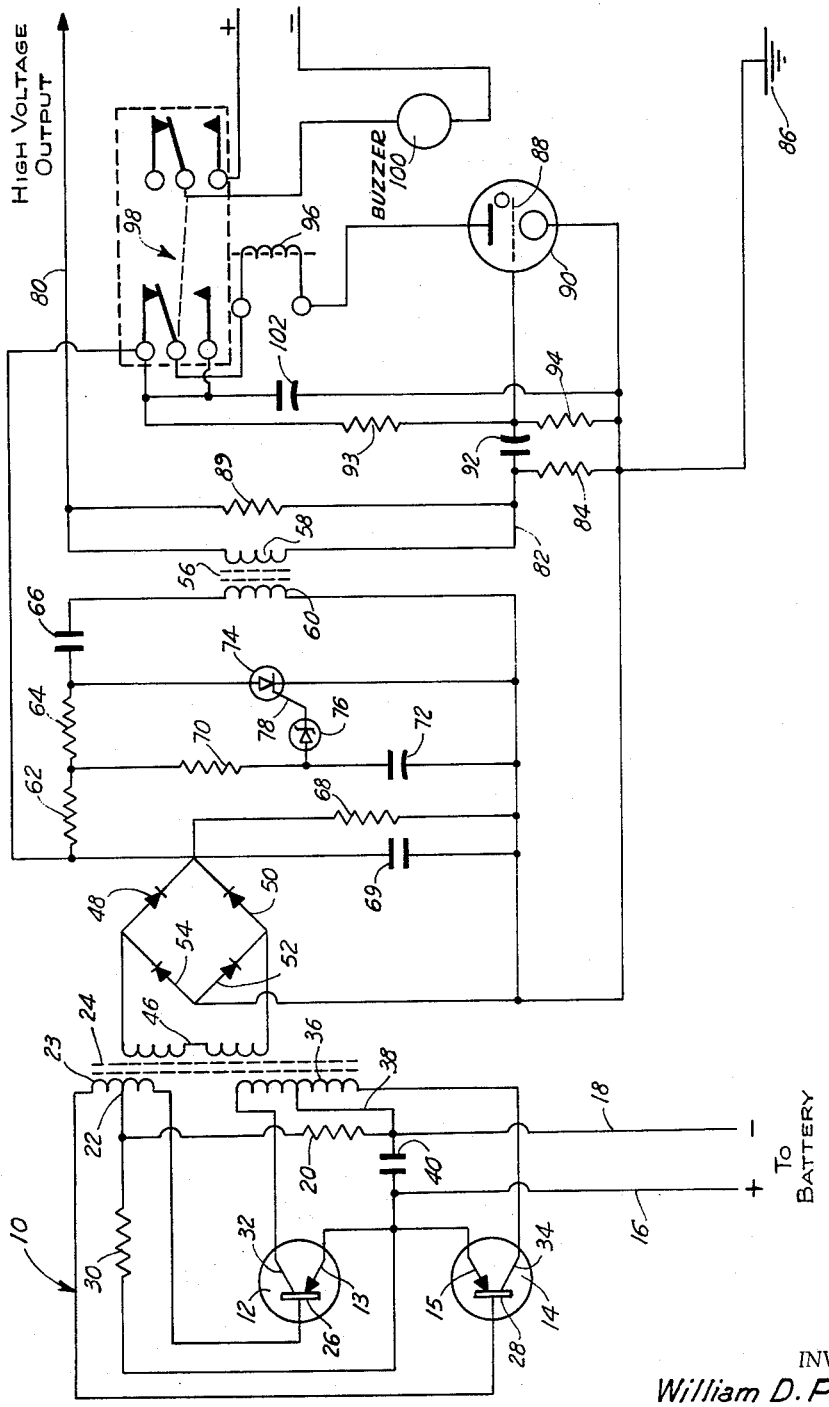
INVENTOR.
William D. Parker
BY
William S. Dorman
ATTORNEY United States Patent Office 3,259,893
Patented July 5, 1966

3,259,893
HOLIDAY DETECTOR
William D. Parker, Tulsa, Okla., assignor of one-half to Rayburn M. Ramsey, Broken Arrow, Okla.
Filed July 24, 1962, Ser. No. 211,994
2 Claims. (Cl. 340—248)

This invention relates to improvements in apparatus for detecting flaws in protective coatings and more particularly, but not by way of limitation, to an electrical detector device for inspecting a protective coating, such as an insulating coating on a pipe line, or the like, to indicate the presence of imperfections in the coating.

Pipe lines, or the like, used for transporting, or conveying and distributing natural gas, petroleum, water, or other fluids, are usually provided with a suitable coating to protect the pipe from corrosion or deterioration from the effect of electrolysis due to the cathodic currents developed between damp ground and the metallic material of the pipe. Many types of coatings are utilized, such as tar and paper, asphaltic coatings, vinyl coatings, plastic coatings, or the like, and are normally applied to the exterior of the pipe in relatively thin layers. It is desirable to test the coated pipe prior to placing thereof in the ground in order to ascertain whether or not a thorough coverage of the pipe has been accomplished since any imperfections in the coating may permit a penetration of water or other fluids which may damage or corrode the pipe. This is a particular disadvantage after the pipe has been buried in the ground in that replacement of the damaged pipe sections is difficult and expensive.

These flaws or imperfections in the coating, such as voids, holes, fissures, or the like, are commonly known as "holidays" and there are many types of holiday detector devices which have been developed for inspecting the coated pipe for detection of any "holidays" therein. One such device is disclosed in the J. P. Rasor Patent No. 2,650,346, issued August 25, 1953 and entitled "Apparatus and Method for Testing Pipe Coating."

The conventional holiday detector employs a high voltage probe usually of circular configuration which is adapted to surround the pipe and which can be moved from one end of the pipe to the other. The probe is connected to a high voltage source, customarily alternating current, which is produced by an electrical circuit within the detector starting from a 6 volt battery source. Both the detector and the interior of the pipe are grounded. If the probe passes over a holiday in the coating, there will be an electrical discharge from the probe to the pipe and thence to ground. The detector will have an additional circuit therein responsive to the discharge through a holiday to energize a signalling device, such as a bell or light, whereby an audible or visual signal is provided to indicate a flaw in the coating. In order to change the voltage from a 6 volt battery source to the high voltage required for the probe, prior art holiday detectors have generally employed various combinations of transformers, resistors, capacitors, rectifiers, vacuum tubes, and mechanical multivibrators. One of the disadvantages of the prior art circuits resides in the fact that the mechanical multi-vibrator will wear out in a relatively short period of time and further, that this mechanical multi-vibrator will not necessarily reverse at the points of maximum build up and discharge of the electrical energy which is controlled by the multi-vibrator.

The holiday detector of the present invention includes a novel electrical circuit wherein the mechanical multivibrator, which was heretofore employed for building up the high voltage from the 6 volt source, is replaced by electrical components, such as semiconductor devices, which have no moving parts. Furthermore, the electrical circuit of the present invention is so arranged that the reversal of voltage across the primary of the output transformer coincides with the maximum build up of voltage in the capacitor which is connected across this primary. Therefore, it should be apparent that the operating efficiency of the circuit is improved thereby. An important feature of the present invention resides in the fact that the necessity for replacing a mechanical multi-vibrator due to the wearing of the parts thereof is completely eliminated.

It is, therefore, an important object of this invention to provide a novel detecting apparatus for testing the protective coating of a pipe line, or the like.

It is another object of this invention to provide a novel holiday detector device particularly designed and constructed for locating a flaw in a protective coating and energizing a signalling device for indicating the presence of the flaw.

Another object of this invention is to provide a novel holiday detector apparatus wherein the signalling of a flaw in a protective coating is substantially instantaneous with the detection of the flaw, thus increasing the accuracy of locating of the flaw.

A further object of this invention is to provide a novel holiday detector apparatus provided with an electrical multi-vibrator mechanism for increasing the speed of signalling the detection of a flaw in a protective coating.

A further object of the present invention is to provide a novel holiday detector apparatus wherein the mechanical multi-vibrator previously employed in prior art detectors is replaced by an all-electrical multi-vibrator so as to eliminate the wear heretofore experienced with the mechanical device.

A still further object of this invention is to provide a novel holiday detector device which is simple and efficient in operation and economical and durable in construction.

Other and further objects and advantageous features of the present invention will hereinafter more full appear in connection with a detailed description of the attached drawing which shows the electrical circuit diagram of a holiday detector embodying the present invention.

Referring to the drawing in detail, the power supply, generally indicated by reference numeral 10, comprises two transistors 12 and 14 arranged in push-pull connection and operating off a suitable 6 volt battery (not shown). One lead 16 connects the positive terminal of the battery directly to the emitters 13 and 15 of the transistors 12 and 14, respectively, in common. A second lead 18 connects the negative terminal of the battery through a resistor 20 and a central tap 22 of a feed back winding 23 of a transformer 24 to the base portions 26 and 28 of the transistors 12 and 14 in parallel. A second resistor 30 is connected from the center tap 22 of the feed back winding to the emitters 13 and 15 in common. The collector portions 32 and 34 of the transistors 12 and 14, respectively, are connected to the opposite ends of the primary winding 36 of the transformer 24. The negative lead 18 is connected in common to the transistors 12 and 14 through the center tap 38 of the primary winding 36, and a capacitor 40 is connected between the center tap 38 and the emitter portions 13 and 15 of the transistors 12 and 14, respectively.

The transformer 24 is provided with a secondary winding 46 across the output of which is connected four diodes 48, 50, 52, and 54 in a bridge type arrangement. The circuit hereinbefore set forth oscillates at approximately 5,000 cycles per second with an output across the secondary 46 of approximately 125 volts.

A second transformer or pulse coil 56 of the step-up type provided in the circuit has an approximate 300 to 1 ratio between the secondary 58 and the primary 60 thereof. The output of the diode bridge is connected across the primary 60 in series with resistors 62 and 64 and capacitor 66 whereby the capacitor 66 charges up to the approximate full value of the output from the transformer 24. Purely by way of example, the values of resistors 62 and 64 can be about 1,200 and 900 ohms, respectively, and the value of capacitor 66 can be about 14 mfd. A resistor 68 having a value of approximately 300K ohms and a capacitor 69 of approximately 0.2 mfd. are connected in parallel across the output of the diode bridge also. Another resistor 70 of approximately 200K ohms and a capacitor 72 of approximately 1 mfd. are connected in series with each other and in series with the resistor 62 across the output of the diode bridge. A control rectifier 74 having a gate 78 is connected in parallel with the capacitor 66 and the primary 60 of the output transformer 56.

The control rectifier 74 has been described as a solid state thyratron device and is preferably a diffused silicon PNPN 4 layer (3 junction) unit. The operation of the control rectifier is such that it will function as a unidirectional conductor only, however, after a predetermined voltage has been applied to the "gate" of the rectifier.

A suitable trigger device 76, similar to a Zener diode, has one of its terminals connected between the resistor 70 and the capacitor 72 and its other terminal connected to the gate 78 of the control rectifier 74. The trigger device 76 will not conduct until the voltage on the capacitor 72 builds up to a predetermined value, for example, approximately 10 volts. The voltage on the capacitor 72 will build up to the latter voltage approximately at that time when the voltage on the capacitor 66 builds up to its maximum value. When the voltage on the capacitor 72 builds up to the stated value, the trigger device 76 will conduct and will place a bias on the gate 78 of the control rectifier 74 causing the control rectifier to conduct current in such a manner that the capacitor 66 discharges through the control rectifier causing electric current to pass through the primary 60 of the transformer 56. After the capacitor 66 discharges, the control rectifier 74 ceases to conduct and the charge on the capacitor 66 again builds up causing electric current to flow through the primary 60 in the reverse direction. As a result of the charging and discharging of the capacitor 66, a voltage of approximately 30,000 volts is produced across the secondary 58 of the transformer 56.

The arrangement and values of the circuit components described above is such that the output across the secondary of the transformer 56 consists of sharp pulses at a repetition rate of about 30 to 70 cycles per second.

The high voltage output from the secondary 58 of the transformer 56 is connected by a lead 80 to a probe (not shown). The opposite end of the secondary 58 is connected by a lead 82 through a resistor 84 to ground, as indicated at 86. An output resistor 89, preferably of the plug-in type, is connected across the secondary to provide a variation in the output voltage, depending upon the value of this resistor.

A voltage divider network comprising resistors 93 and 94 is connected across the output from the first transformer 24 so as to put a D.C. bias on the grid 88 of a thyratron 90, this bias being less than that required to cause the thyratron to conduct. A capacitor 92 is connected between the resistor 84 and the grid of the thyratron, whereby, when the probe passes over a "holiday" or flow in the coating being tested, there will be an instantaneous discharge, current will pass through the resistor 84, and at the same time a pulse will be conducted through the capacitor 92 to the grid 88 of the thyratron 90, causing the thyratron to fire.

The coil 96 of a relay 98 is connected in the plate circuit of the thyratron 90 in such a manner that when the thyratron 90 fires, the relay 98 will be energized to pass a current of 6 volts across a buzzer or warning circuit, indicated by the buzzer 100 and leads associated therewith, thereby indicating the presence of an imperfection or "holiday" in the coating.

A capacitor 102 is connected across the cathode and plate of the thyratron 90 when the relay is energized in order to maintain the thyratron in a conducting condition for a longer period of time than would otherwise be obtained without the capacitor.

The components of the above described circuit are enclosed in a suitable casing along with a battery (not shown) preferably of the Ni-Cad type. The high voltage lead 80 connects with a probe externally of the casing, this probe being any suitable well known type preferably in the form of a movable ring. Grounding of the instrument is preferably effected by means of a trailing ground wire. In operation, the pipe to be tested is grounded, the movable ring is placed over the pipe and the operator moves the ring and the instrument casing along the length of the pipe, the trailing ground wire passing over the surface of the ground during this movement. Whenever the movable ring passes over a holiday, the high voltage probe will discharge through the coating and to the pipe which is grounded; at the same time, current will pass through the resistor 84 causing the thyratron to fire, thereby sounding the warning circuit 100. In the present invention there are no mechanical vibrators having points which will burn or corrode. All power switching is done by transistors and other solid state devices. The output consists of sharp high voltage pulses at a repetition rate of from 30 to 70 cycles per second, making the apparatus ideal for the detection of holidays even in damp or moist coatings. Although specific values for certain of the circuit components have been given above for the purpose of a more concise explanation, it should be understood that these are illustrative and not limiting values.

Whereas, the present invention has been described in particular relation to the circuit diagram attached hereto, it should be understood that other and further modifications, apart from those shown or suggested herein, may be made within the spirit and scope of this invention.

What is claimed is:

1. In a holiday detector, a low voltage D.C. source, multi-vibrator means for converting the voltage from said low voltage D.C. source to an intermediate A.C. voltage, means for rectifying the intermediate A.C. voltage into an intermediate D.C. voltage, a step-up transformer having a secondary winding for generating a high voltage output and a low voltage primary winding, a charging capacitor, said primary winding being connected between one side of the rectifying means for said intermediate D.C. voltage and one side of said charging capacitor, a first low value resistor having one terminal connected to the other side of said charging capacitor, a second low value resistor having one terminal connected to the other terminal of said first resistor and having its other terminal connected to the other side of the rectifying means for said intermediate D.C. voltage, a control rectifier connected between said other side of said charging capacitor and said one side of the rectifying means for said D.C. voltage, said control rectifier having a gate for placing a bias on said control rectifier, said control rectifier being non-conductive in either direction when the bias on said gate is less than a predetermined value, said control rectifier being conductive in one direction only when the bias on said gate equals said predetermined value, a third intermediate value resistor having one terminal connected between the junction of said first and second resistors, a second capacitor having one terminal connected to the other terminal of said third resistor and having its other terminal connected to said one side of the rectifying means for said intermediate D.C. voltage, and a trigger device having one terminal connected between said third resistor and said second capacitor and having another terminal connected to said gate, said trigger device being conductive only when the voltage on said second capacitor builds up to a certain amount, said trigger device, in conducting after the voltage on said second capacitor builds up to said certain amount, placing said predetermined bias upon said control rectifier to cause said first capacitor to discharge through said control rectifier and said primary winding thereby creating a high voltage pulse in the secondary winding of said output transformer.

2. In a holiday detector, a low voltage D.C. source, multi-vibrator means for converting the voltage from said low voltage D.C. source to an intermediate A.C. voltage, means for rectifying the intermediate A.C. voltage into an intermediate D.C. voltage, a step-up transformer having a secondary winding for generating a high voltage output and a low voltage primary winding, a charging capacitor, said primary winding being connected between one side of the rectifying means for said intermediate D.C. voltage and one side of said charging capacitor, a first low value resistor having one terminal connected to the other side of said charging capacitor, a second low value resistor having one terminal connected to the other terminal of said first resistor and having its other terminal connected to the other side of the rectifying means for said intermediate D.C. voltage, a control rectifier connected between said other side of said charging capacitor and said one side of the rectifying means for said D.C. voltage, said control rectifier being non-conductive in either direction when the bias on said gate is less than a predetermined value, said control rectifier being conductive in one direction only when the bias on said gate equals said predetermined value, a third intermediate value resistor having one terminal connected between the junction of said first and second resistors, a second capacitor having one terminal connected to the other terminal of said third resistor and having its other terminal connected to said one side of the rectifying means for said intermediate D.C. voltage, a trigger device having one terminal connected between said third resistor and said second capacitor and having another terminal connected to said gate, said trigger device being conductive only when the voltage on said second capacitor builds up to a certain amount, said trigger device, in conducting after the voltage on said second capacitor builds up to said certain amount, placing at least said predetermined bias upon the gate of said control rectifier to cause said first capacitor to discharge through said control rectifier and said primary winding thereby creating a high voltage pulse in the secondary winding of said output transformer, and alarm means connected to said secondary winding for producing a sensible indication in response to the discharge of high voltage from said secondary winding.

References Cited by the Examiner

UNITED STATES PATENTS

| | | | |
|---|---|---|---|
| 1,950,484 | 3/1934 | Clarvoe | 324—54 |
| 2,650,346 | 8/1953 | Rasor | 324—54 |
| 2,920,270 | 1/1960 | Saw | 324—54 |
| 3,049,642 | 8/1962 | Quinn. | |
| 3,089,965 | 5/1963 | Krezek. | |
| 3,091,729 | 5/1963 | Schmidt. | |
| 3,134,048 | 5/1964 | Welframm et al. | 315—206 |
| 3,201,597 | 8/1965 | Balan | 307—88.5 |

NEIL C. READ, *Primary Examiner.*

D. K. MYER, *Assistant Examiner.*